United States Patent [19]
Van Andel et al.

[11] Patent Number: 5,621,531
[45] Date of Patent: Apr. 15, 1997

[54] SELF-ALIGNING SEWER PIPE LASER

[75] Inventors: Richard J. Van Andel, Grand Rapids; Gary L. Utter, Middleville; Gregory J. Nagel, Grand Rapids, all of Mich.

[73] Assignee: Laser Alignment, Inc., Grand Rapids, Mich.

[21] Appl. No.: 415,663

[22] Filed: Apr. 3, 1995

[51] Int. Cl.$^6$ .................................................. G01B 11/00
[52] U.S. Cl. ............................................. 356/399; 33/286
[58] Field of Search .................................. 356/399–401, 356/141.2–141.4, 152.2; 33/286, 228, 290, 293–296, DIG. 21; 250/203.1, 559.38, 203.2, 206.1

[56] References Cited

U.S. PATENT DOCUMENTS

| | | |
|---|---|---|
| 3,488,854 | 1/1970 | Trice, Jr. . |
| 3,515,486 | 6/1970 | Vonderohe et al. . |
| 3,591,926 | 7/1991 | Trice, Jr. . |
| 3,634,941 | 1/1972 | Roodvoets et al. . |
| 3,742,581 | 7/1973 | Roodvoets . |
| 3,778,168 | 12/1973 | Willner . |
| 3,790,277 | 2/1974 | Hogan . |
| 3,815,250 | 6/1974 | Roodvoets et al. . |

(List continued on next page.)

FOREIGN PATENT DOCUMENTS

0595271A1   5/1994   European Pat. Off. .

OTHER PUBLICATIONS

Product brochure entitled "Pipe Laser TP–L2" Topcon Corporation, Jul. 1994.
Product brochure entitled "Grade light Pipe laser", AGL Corporation, Nov. 1991.
Product brochure, entitled, "Pipe–laying Laser KL75", GGS Laser Switzerland, Mar. 1994.
Product brochure entitled, "The Builder—Simplicity—The Key of Laying Pipes", AMA Laser Systems, Mar. 1995.
Product brochure entitled "Pipe laser 1550 Visible Beam Laser System", White, Dec. 1993.
Product brochure entitled Arrow™—Pipe Laying Laser; Apache Technologies Date Unknown.
Product brochure entitled "ES Verbau" Edmunds and Staudinger, Date Unknown.
Product brochure entitled "Sokkia Slip 100 Kanal bau laser", Sokkia GmbH, Date Unknown.

(List continued on next page.)

*Primary Examiner*—K. Hantis
*Attorney, Agent, or Firm*—Van Dyke, Gardner, Linn & Burkhart, LLP

[57] ABSTRACT

A method and apparatus for aligning individual sections of pipe includes directing a beam of collimated light in the general direction of the pipeline and scanning the beam laterally. A target, having a retro reflective portion, is positioned in a location that will be traversed by the scanning beam. A reflection of the beam produced by the reflective portion is received and processed. The scanning is discontinued when the reflective portion is located and the beam is aimed in a direction related to the position of the retro reflective target.

6 Claims, 10 Drawing Sheets

U.S. PATENT DOCUMENTS

| | | |
|---|---|---|
| 3,819,273 | 6/1974 | Unema et al. . |
| 3,823,313 | 7/1974 | Unema . |
| 3,865,491 | 2/1975 | Hogan . |
| 3,907,435 | 9/1975 | Roodvoets . |
| 4,035,084 | 7/1977 | Ramsay . |
| 4,053,238 | 10/1977 | George et al. . |
| 4,441,812 | 4/1984 | Feist . |
| 4,706,773 | 11/1987 | Reinaud . |
| 4,712,915 | 12/1987 | Kosakowski et al. . |
| 4,732,472 | 3/1988 | König et al. . |
| 4,766,393 | 8/1988 | Johnson . |
| 4,790,402 | 12/1988 | Field et al. . |
| 4,830,489 | 5/1989 | Cain et al. . |
| 4,846,297 | 7/1989 | Field et al. . |
| 4,907,879 | 3/1990 | Webb . |
| 4,970,794 | 11/1990 | Buckley . |
| 5,030,004 | 7/1991 | Grant et al. . |
| 5,047,609 | 9/1991 | Ekstrand . |
| 5,051,934 | 9/1991 | Wiklund . |
| 5,055,666 | 10/1991 | Miyahara . |
| 5,084,980 | 2/1992 | Skopec et al. . |
| 5,123,737 | 6/1992 | Eichweber . |
| 5,204,731 | 4/1993 | Tanaka et al. . |
| 5,216,480 | 6/1993 | Kaneko et al. . |
| 5,294,970 | 3/1994 | Dornbusch et al. . |
| 5,313,409 | 5/1994 | Wiklund et al. . |
| 5,319,187 | 6/1994 | Ammann . |
| 5,331,745 | 7/1994 | Jager . |
| 5,347,136 | 9/1994 | Ammann . |
| 5,347,387 | 9/1994 | Rice . |
| 5,440,112 | 8/1995 | Sakimura et al. . |

OTHER PUBLICATIONS

Publication in *Trenchless Technology*, May, 1994, entitled "Review of Pipelaser Systems."

Product brochure entitled "4700 Series Beam Aligner," published in the United States more than one year before the filing date of the present application by Laser Alignment, Inc.

Product brochure entitled "Dialgrade® Model 1165 and 1160," published in the United States on Apr., 1993, by Spectra-Physics Laserplane, Inc.

Product brochure entitled "LCI Lasers for Construction, Inc. PL120," published in the United States by Lasers for Construction, Inc., Dec., 1994.

Product brochure entitled "Baulaser Quante QL 150 D," published by Quante Baulase GmbH, Mar., 1995.

SELF-ALIGNING SEWER PIPE LASER

BACKGROUND OF THE INVENTION

This invention relates generally to alignment instruments used in construction and, in particular, to an apparatus for aligning individual sections of pipe in a pipeline. More particularly the invention relates to a self-aligning laser beam method and apparatus for laying pipe such as sewer pipe.

It has long been known to utilize a beam of collimated light, directed in the desired direction, for laying a pipeline in order to align individual sections of pipe in a straight line and at a particular grade. A target is positioned at the end of the pipe being positioned and is utilized to manipulate new sections of pipe until the light beam is centered on the target. After the section of pipe is secured, the target is moved to the next section of pipe to be added. Such technique is disclosed in U.S. Pat. Nos. 3,488,854; 3,591,926; and 3,634,941, all assigned to the assignee of the present application.

One difficulty with such technique is that the apparatus must be disassembled and stowed away at the end of each workday. If less than the entire pipeline is laid in a day, it is necessary to set up the equipment the next day in order to resume construction. In order for the user to extend a previously laid portion of pipeline, two workers were required; one to set up and monitor the target and the other to set up and align the laser unit until the laser beam strikes the center of the target as observed by the other worker. This process is inefficient because it requires two workers who must communicate and coordinate their actions at a considerable distance either via radio or, if none is immediately available, via shouts and hand signals.

In order to overcome such difficulties, it has been proposed to provide an active target which is equipped with a plurality of photocells arranged in a particular pattern to automatically align the laser beam. The active target includes a controller which responds to a laser beam striking the photocells in order to transmit a control signal to a controller in the laser. The laser responds to the control signal by repositioning the beam. While such device eliminates the requirement for two workers, it introduces additional cost and complexity in the apparatus. The active target requires electronic circuitry and must be powered from a separate battery.

SUMMARY OF THE INVENTION

The present invention provides a pipe-aligning apparatus and method of aligning individual sections of pipe in a pipeline, which eliminates the requirement for two workers in order to re-establish the equipment and extend a previously laid portion of pipeline. The invention meets this objective with the use of a passive target which does not require complicated electronic circuitry and batteries. Furthermore, the present invention provides an improved method for laying pipe in a curved section.

A method of aligning individual sections of pipe, according to the invention, includes directing a beam of collimated light generally in the general direction of the pipeline and scanning the beam laterally. A target, having a retroreflective portion, is positioned in a location that will be traversed by the scanning beam. A reflection of the beam produced by the reflective portion is received and processed. The scanning is discontinued when the reflective portion is located and the beam is aimed in a direction related to the position of the retroreflective target. Such method is carded out, according to the invention, by a pipe-aligning apparatus, including a laser unit and a target. The laser unit includes a source for generating a collimated beam of light and a scanning device for scanning the beam of collimated light laterally. The laser unit further includes a receiver for receiving light and a control that is responsive to the receiver and to the scanning device in order to provide an indication of the position of the beam when the receiver receives light. The control causes the scanning device to position the beam as a function of the indication. The target has a retroreflective portion to reflect the beam to the receiver. The control positions the beam with respect to the retroreflective portion provided that the target is positioned in the scanning beam. The apparatus may further include a remote control unit including a user input selection device, a signal generator, and a remote control circuit which controls the signal generator in response to user activation of the user input selection device to produce a signal that is received by the laser unit receiver in order to provide commands to the laser unit control. In this manner, the mode of the laser unit may be adjusted remotely from the location of the target in order to improve the functionality of the unit. Advantageously, the signal output from the remote control unit is light which may be in the same band or in a different band as that generated by the laser unit, but distinguishable from the laser unit's light.

The invention may be utilized to lay straight sections of pipe by scanning a beam within the pipeline and positioning the target within the pipeline. Such target preferably includes a pair of retroreflective strips, which are positioned on opposite sides of a a visual beam indicator. In this manner, the retroreflective strips do not interfere with the normal operation of aligning additional sections of pipe using the beam indicator. The beam is laterally aligned to previously laid sections of pipe utilizing such target by determining the position of the beam when reflected from each of the retroreflective strips and repositioning the beam midway between the two positions. In order to lay curved sections of pipe, the beam is scanned outside of the pipeline such as in a position above the pipeline. The target may then be positioned at the distal end of each new section of pipe and utilized to redirect the beam laterally in the direction of the curved pipe. In this fashion, the beam may be easily realigned as each new section of curved pipe is added to establish grade at the distal end of each section of pipe. In addition, by reading the position of the beam, as repositioned at the end of each section of pipe, it is even possible to verify the lateral positioning of the curved sections of pipe. However, the lateral position of each curved section of pipe may be established by conventional techniques, such as by surveying. Additionally, the grade of the pipes may be established utilizing the grade-aligning feature of the laser unit.

These and other objects, advantages, and features of this invention will become apparent upon review of the following specification in conjunction with the drawings.

DESCRIPTION OF THE PREFERRED EMBODIMENTS

Figure 1:
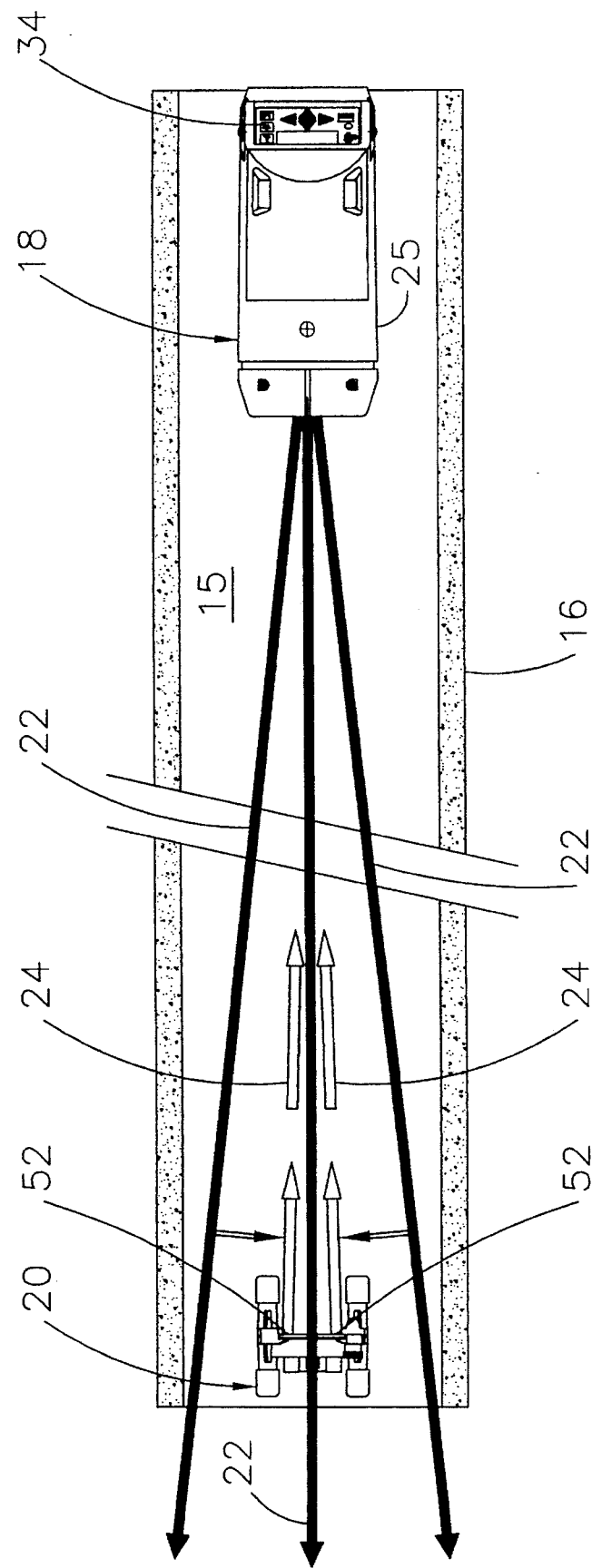
FIG. 1 is a top plan view of a pipe-aligning apparatus, according to the invention, being used within a pipeline.
Figure 2:
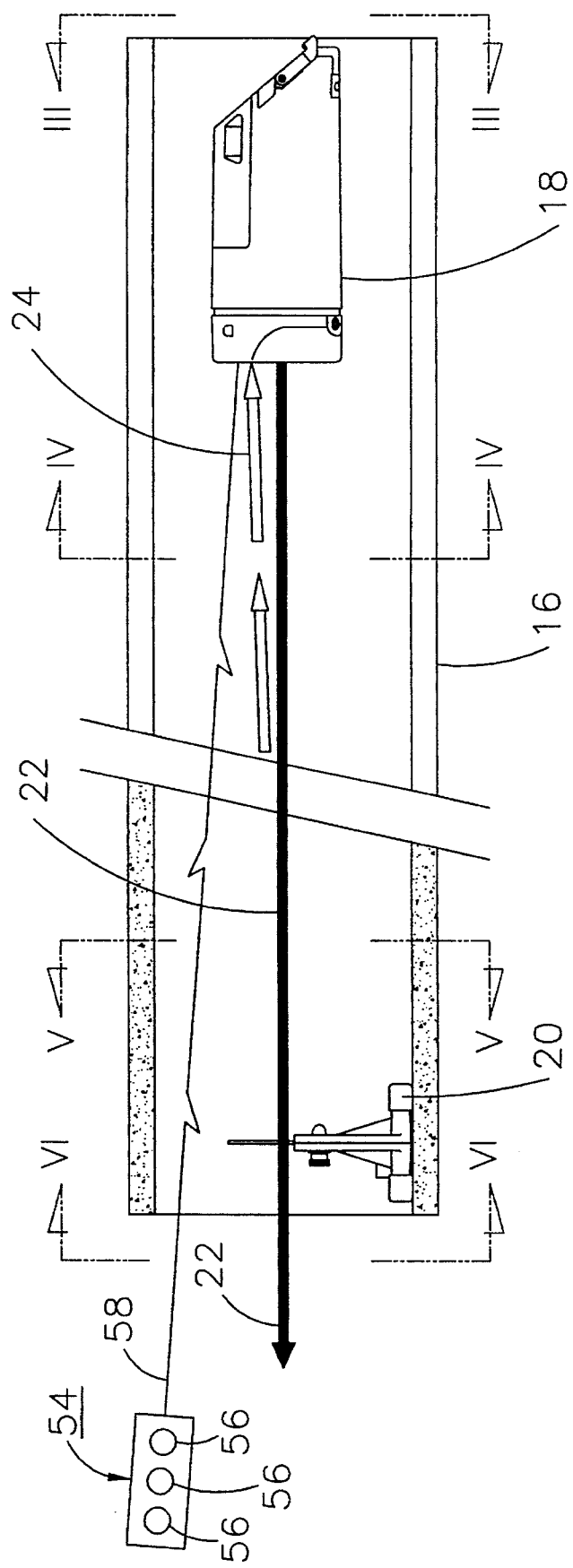
FIG. 2 is a side elevation of the apparatus in FIG. 1.
Figure 3:
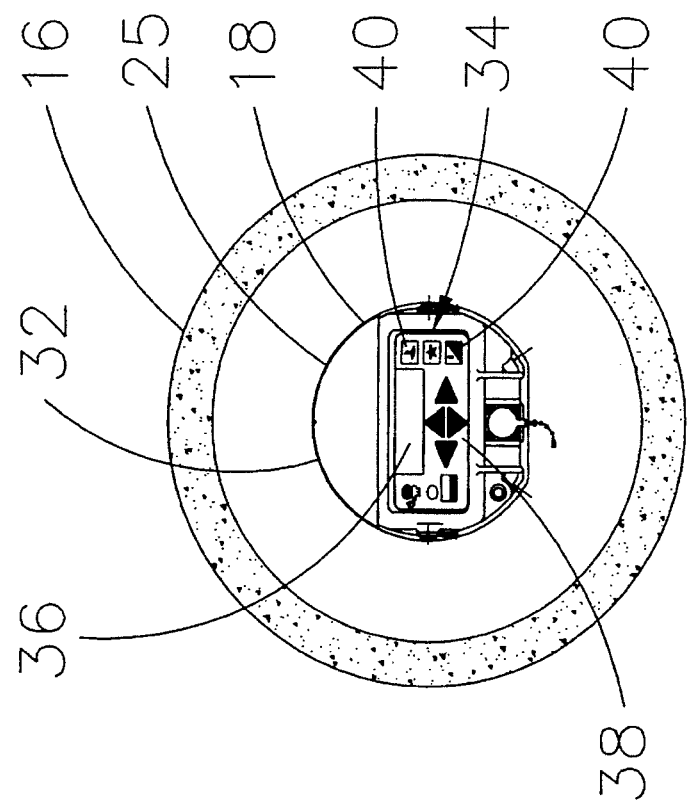
FIG. 3 is a sectional view taken along the lines III—III in FIG. 2.
Figure 4:
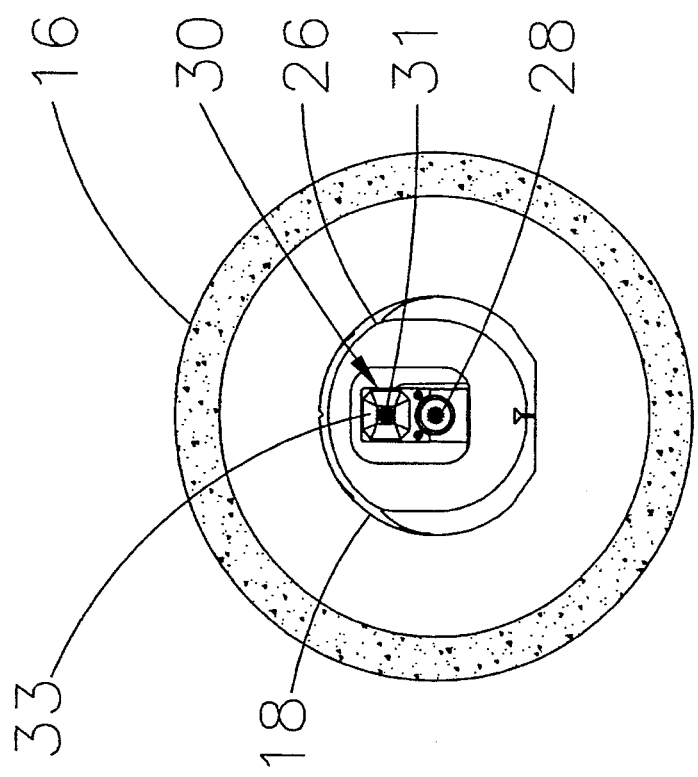
FIG. 4 is a sectional view taken along the lines IV—IV in FIG. 2.

Referring now specifically to the drawings, and the illustrative embodiments depicted therein, a pipe-aligning apparatus, generally indicated at 15, is illustrated in FIGS. 1–6 aligning individual sections of pipe in a pipeline 16. Pipe-aligning apparatus 15 includes a laser unit 18 and a target 20. Laser unit 18 generates a collimated beam of light 22 in either infrared or visible wavelengths, which scans laterally across the face of target 20. Light beam 22 is reflected toward laser unit 18 by a retroreflective portion of target 20, as illustrated by reflected beam 24.

Laser unit 18 includes a housing 25 having a first end 26 thereof. End 26 includes a light source generally indicated at 28 for generating light beam 22 and a receiver 30 for receiving reflected beam 24. Receiver 30 includes a photosensor 31 and a light-collecting surface 33 surrounding the sensor. Housing 25 includes a second end 32. Upon which is positioned a control panel 34. Control panel 34 includes a display 36 for reading out the grade angle at which laser unit 18 is set and at least a general indication of the lateral angle of beam 22. Display 36 may additionally include indicia which advise the operator of the mode of operation of the laser unit as well as various operation conditions of the laser unit. Control panel 34 further includes user input switches 38 which receive user input selections to raise or lower the grade level and manually direct the beam laterally left or right and selection switches 40 which allow the operator to select the mode of operation of the laser unit.

Figure 5:
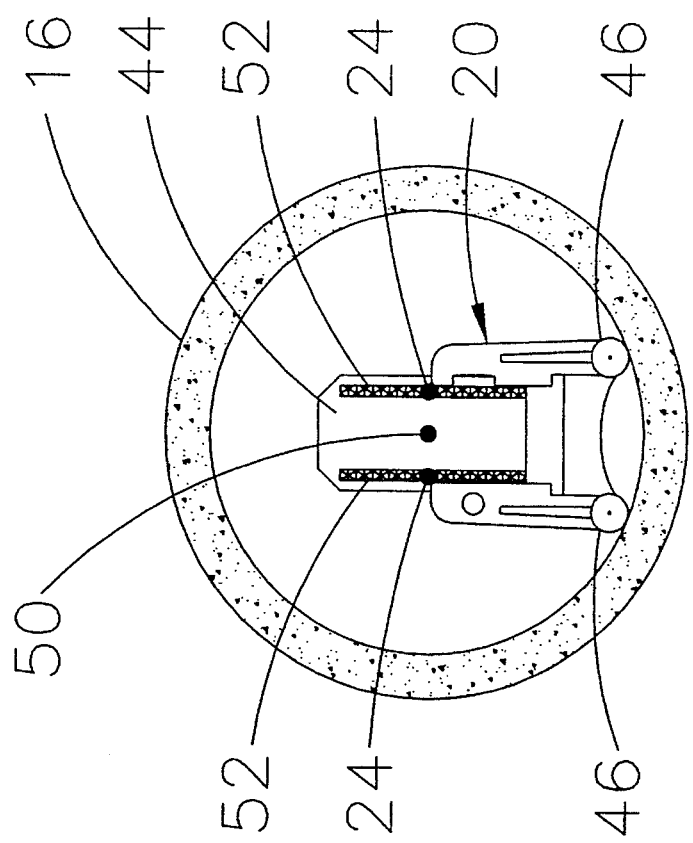
FIG. 5 is a sectional view taken along the lines V—V in FIG. 2.
Figure 6:
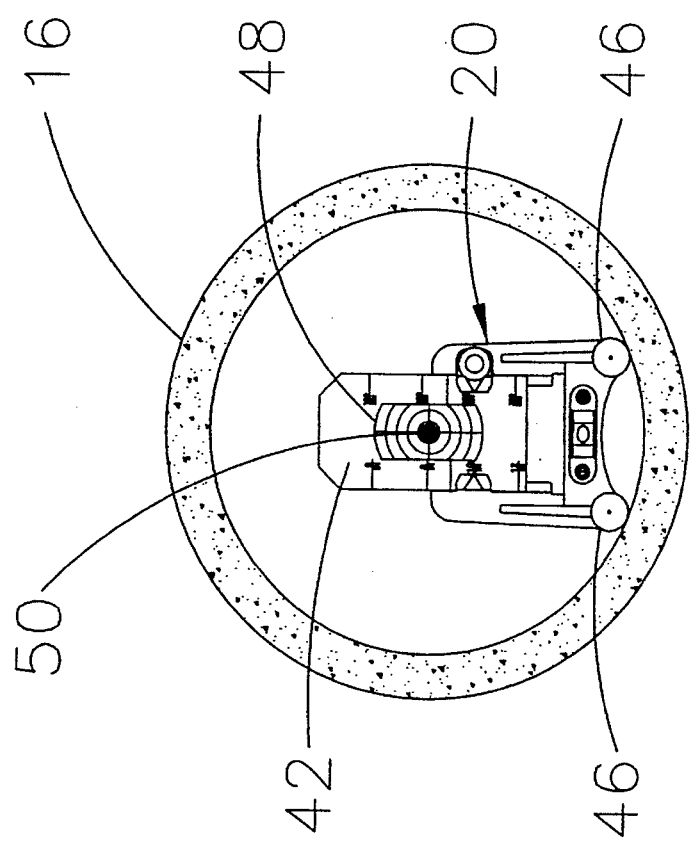
FIG. 6 is a sectional view taken along the lines VI—VI in FIG. 2.

Target 20 includes a face 42, which is directed away from laser unit 18 (FIG. 6), and an opposite face 44, which is directed in the direction of laser unit 18 (FIG. 5). Target 24 includes a pair of feet 46, which rest upon the inner-curved surface of pipeline 16. As is conventional, the target includes a beam alignment indicator 48 which is made of a sheet of translucent material in order to view the location of beam 22 upon the indicator. The indicator may include a central bull's-eye 50, which visually indicates that the beam 22 is centrally positioned within pipeline 16. Face 44 of target 20 has a retroreflective portion made up of a pair of retroreflective strips 52, which are spaced apart and positioned on opposite sides of beam alignment indicator 48. Bull's-eye 50 is located centrally between retroreflective strips 52.

Figure 11:
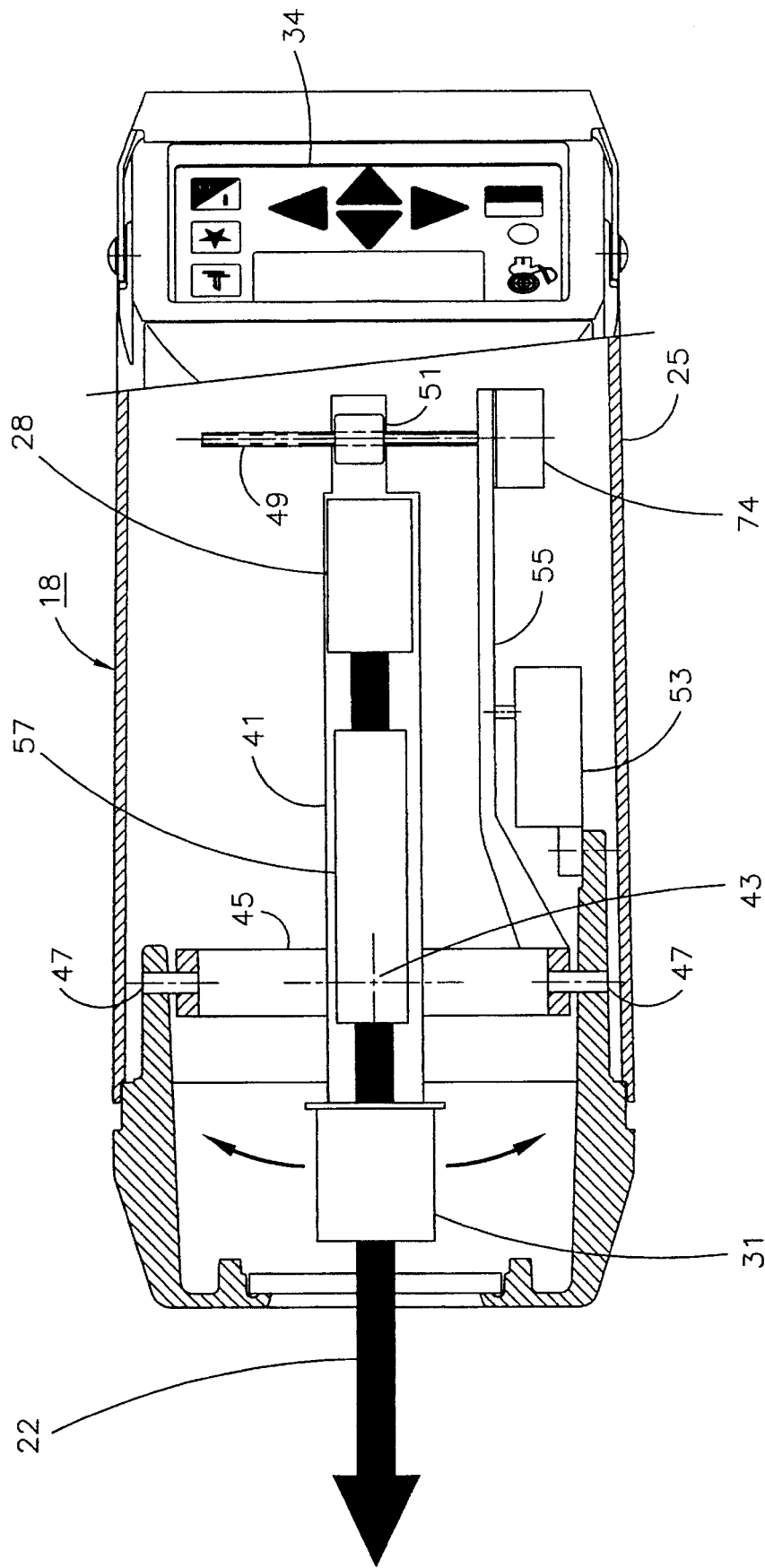
FIG. 11 is a top plan view of a laser unit with the cover removed to illustrate the internal components of the laser unit.

Laser unit 18 scans beam 22 with the structure revealed in more detail in FIG. 11. A frame member 41 is pivotally mounted at 43 to a second frame member 45. Frame member 45 is pivotally mounted at 47 to the housing. A line motor 74 laterally pivots frame member 41 about pivot 43 by a threaded shaft 49 and nut 51. Light source 28 and photosensor 31 are mounted to opposite ends of frame member 41. A grade motor 53 engages an extension 55 of second frame member 45 in order to pivot the second frame member about pivot 47. This motion of second frame member 45 under the control of grade motor 53 adjusts the elevation (grade) of source 28. In the illustrated embodiment, grade motor 53 is a DC servo motor. In the illustrated embodiment, line motor 74 is a stepper motor. In the illustrated embodiment, light source 28 is a laser-diode unit of the type which is readily available from numerous commercial suppliers but could be a gas laser or other source of visible or invisible light. A beam focusing and alignment member 57 processes the radiation produced by light source 28 :into a collimated beam. Another motor (not shown), which is a stepper motor in the illustrated embodiment, adjusts the angle of an inclinometer (not shown) relative to frame member 41 in order to provide adjustment of the elevation, or grade, of beam 22.

In operation, with laser unit 18 and target 20 suitably positioned within pipeline 16, the operator enters the desired beam elevation (grade) into the laser unit utilizing switches 38 and waits for the unit to internally level and elevate the beam to the correct grade according to conventional techniques. The operator then places the laser unit in a scanning mode which will cause the laser unit to modulate the light beam 22 and sweep the beam radially within the inclined plane determined by the beam elevation, as illustrated in FIG. 1. The laser unit concurrently monitors receiver 30 for indication of a detected return reflection beam 24 produced by beam 22 sweeping across retroreflective strips 52. The position of the beam 22 when a reflected beam is received is retained and processed in order to determine a center between the two reflective strips which should correspond with bull's-eye 50. Laser unit 18 will then align beam 22 to bull's-eye 50 and discontinue modulation of the laser beam. The modulation of the laser beam is, in the illustrative embodiment, a simple duty cycle modulation, which allows the laser unit to discriminate reflected beam 24 from other light sources, including ambient light. If the target has been successfully located, the laser unit indicates that fact by illuminating an appropriate indicia on display panel 36 and, thereafter, reverts to normal operation. If the return reflection from the target is not detected after a given internal, the laser unit indicates that fact with an indicia on display panel 36, discontinues modulating and sweeping the beam, and pauses for input from the user.

Figure 10:
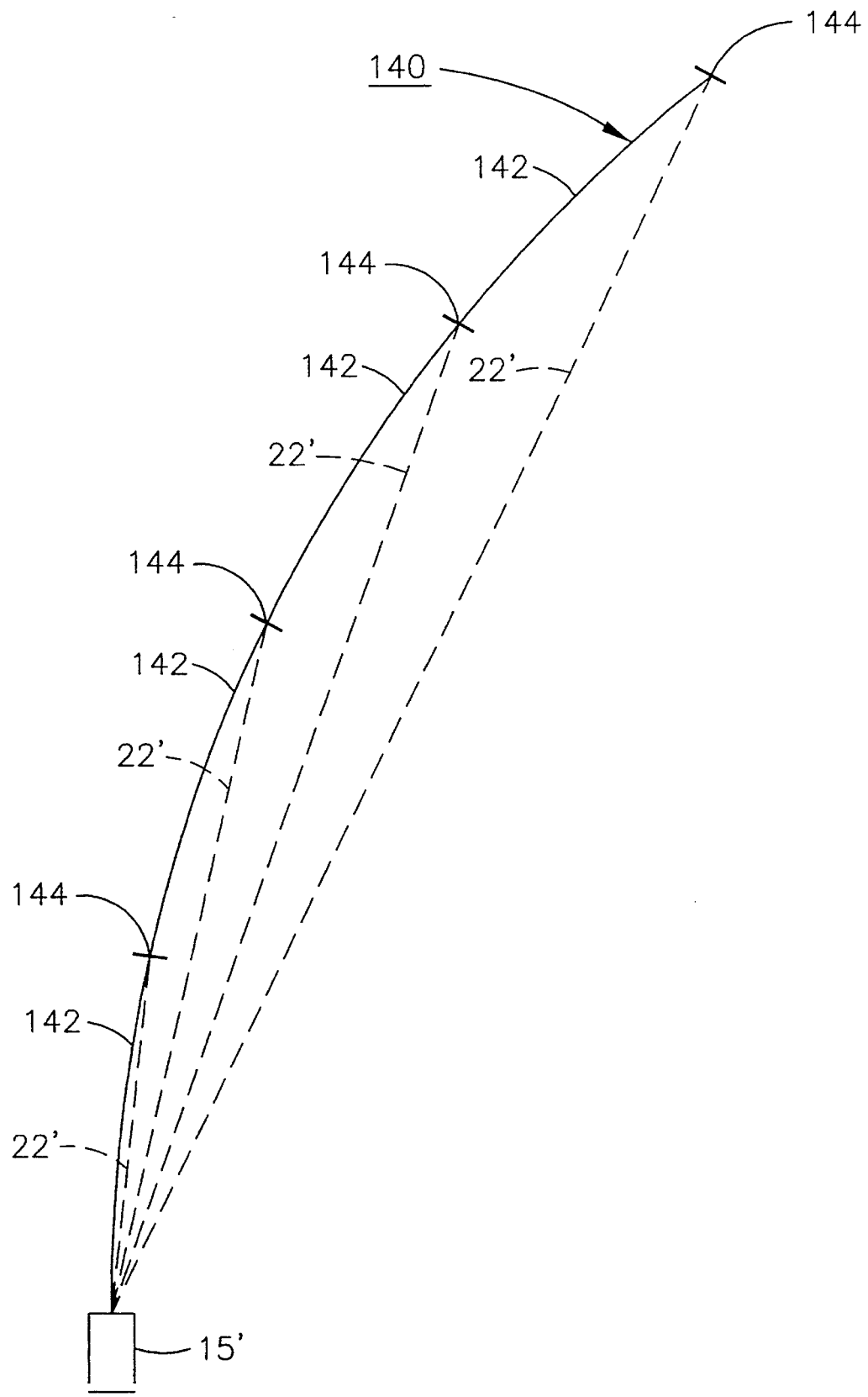
FIG. 10 is a plan view of a curved section of pipeline illustrating use of the invention to lay such curved section of pipeline.

An optional remote control unit 54 includes a plurality of user input selection buttons 56 and a source which generates a signal 58, which is a light beam which may be in the same or in a different wavelength band as beam 22 and is received by receiver 30. In the illustrated embodiment, remote control 54 allows the user to manually adjust the lateral positioning of beam 22 within the inclined plane (grade) and allows the user to turn the beam on and off remotely. Using remote control 54, the user can erect laser unit 18 before placing the target 20 in position. Remote control 54 will also be useful when repetitively aligning the beam to different line positions as in the case of laying curved pipeline via over-the-top operation as illustrated in FIG. 10 and as described in more detail below. To use remote control 54, the user would first erect the laser unit and then enter the desired beam elevation (grade) into the laser unit utilizing switches 38 and actuate appropriate switches to enable initiation of search cycle via remote control. The user would then place target 20 in the end of the pipe. The user would then press the appropriate buttons on the remote control to begin a search cycle. Once activated, the laser unit will modulate the laser beam, sweep it radially within the inclined plane determined by the beam elevation, and monitor the received beam, in the manner previously described, until a reflected beam establishes a location of a target, at which time the beam is positioned relative to the target. At some time later, the user may either actuate the appropriate buttons on remote control 54 to initiate another search cycle or, alternatively, may press a beam ON/OFF button on the remote control to turn off remote control of the self-aligning feature and thus allow manual positioning of the beam using the remote control.

Figure 7:
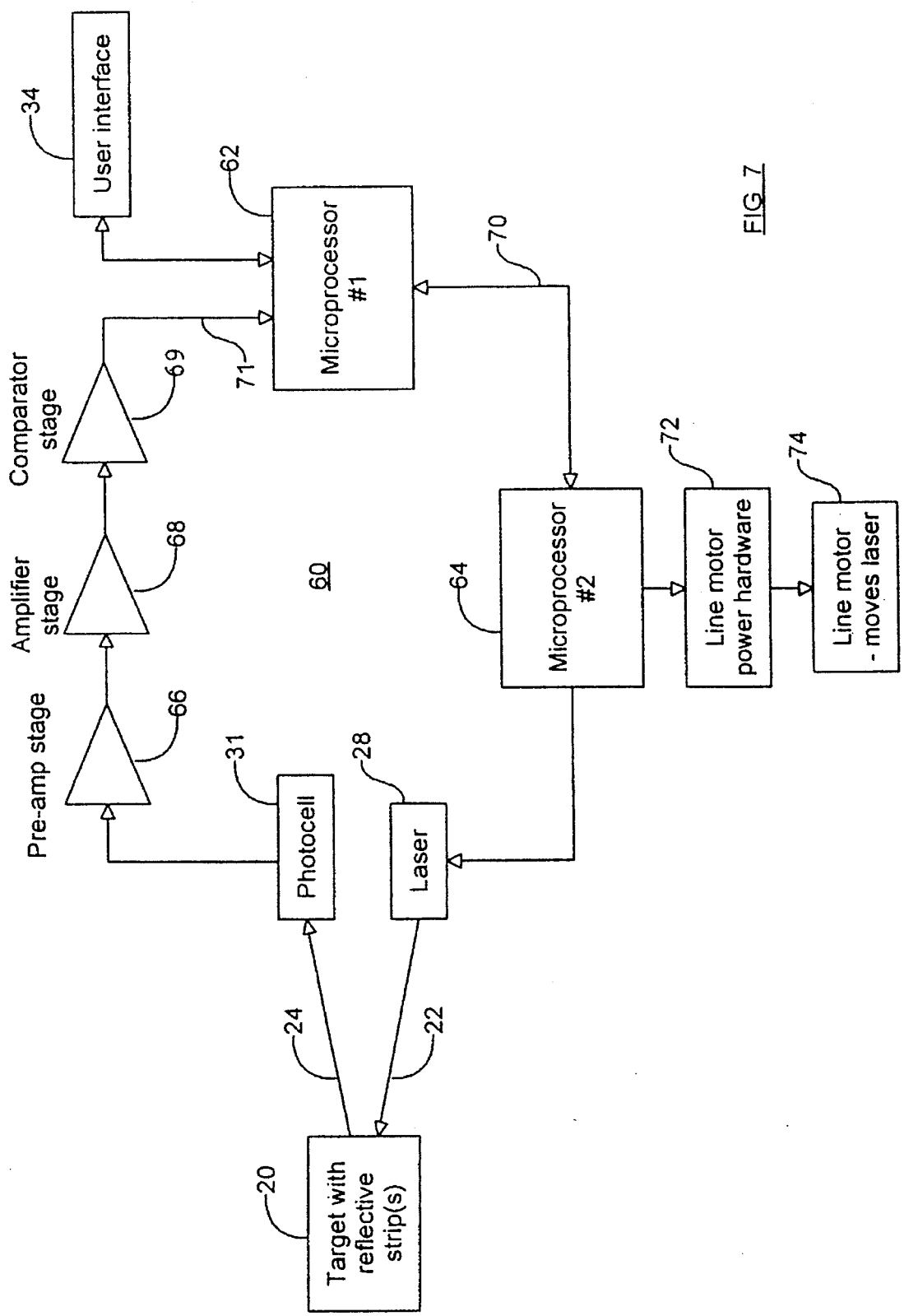
FIG. 7 is a hardware block diagram illustrating a control system useful with the invention.

Laser unit 18 includes a control, generally indicated at 60, having a first microprocessor 62 and a second microprocessor 64. The output of receiver photocell 30 is amplified utilizing a preamplifier stage 66 and an amplifier stage 68 and supplied to a comparator stage 69 where it is determined when the level of light detected by a photocell 30 exceeds a predetermined threshold. An output 71 of comparator stage 69 is provided as an input to processor 62, which also interfaces with control panel 34. Processor 64 communicates with processor 62 over a bus 70. Processor 64 controls the operation of source laser 28 and a circuit 72 which operates a line motor 74 in order to sweep the laser laterally, as illustrated in FIG. 1. In the illustrated embodiment, line motor 74 is a stepper motor which moves in increments in response to a command from processor 64. As such, processor 64 has information at all times of the position of line motor 74. It should be apparent to one of ordinary skill in the art that other techniques could be utilized for monitoring the position of the line motor, and, hence, the generated beam 22, such as by feedback encoders and the like. As illustrated in FIG. 7, source laser 28 generates a modulated laser beam 22 which is reflected from target 20 as reflected beam 24 which is received by receiver photocell 30.

Figure 8:
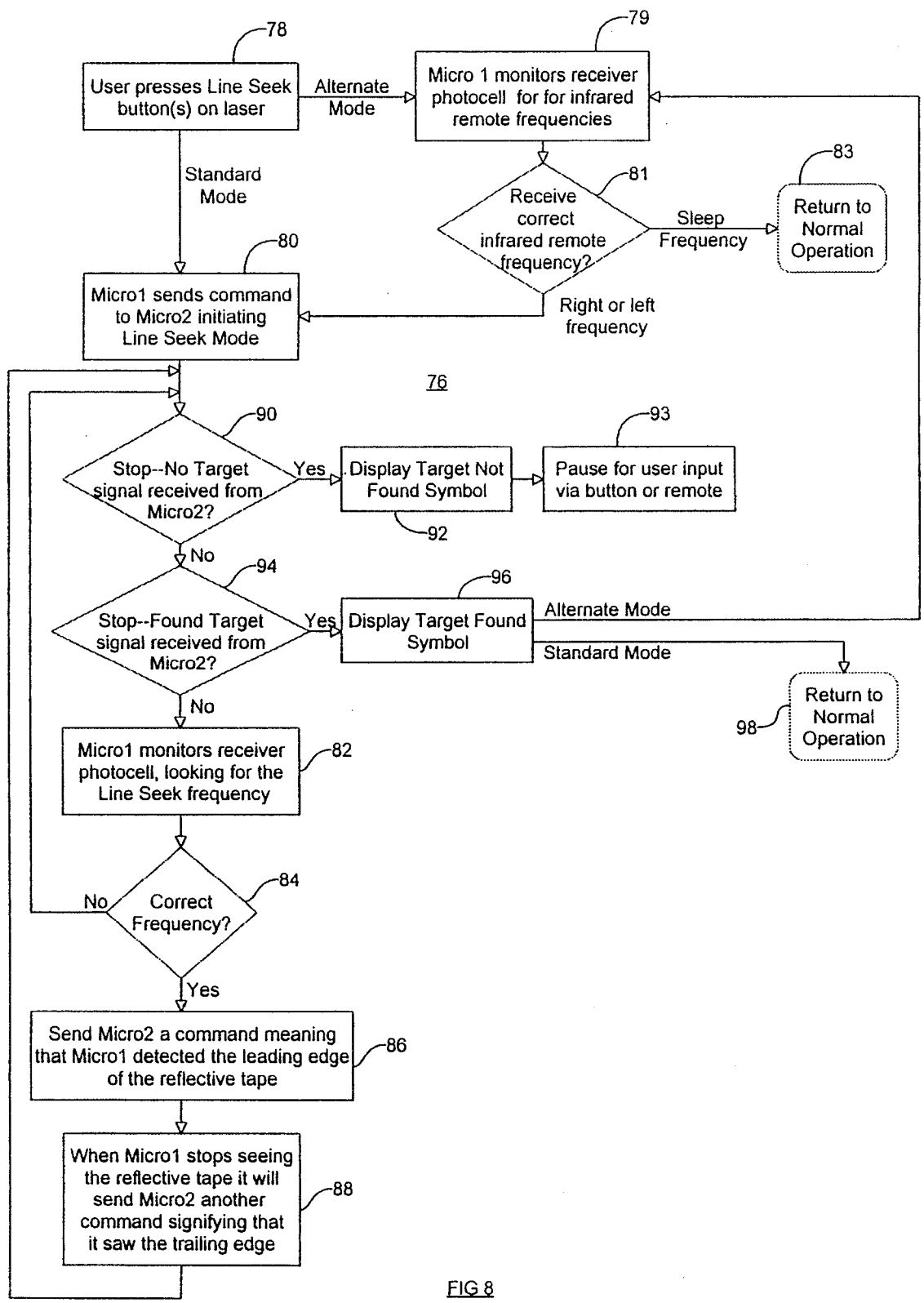
FIG. 8 is a flowchart of a control program for monitoring the receiver and indicating that a reflected beam has been detected.

A control program 76 for processor 62 is illustrated in FIG. 8. Program 76 responds at 78 to the user activating the automatic alignment switch by sending commands at 80 to processor 64 in order to initiate the automatic alignment, or line seek, mode. If it is determined at 90 that processor 64 has provided an indication that it has stopped searching because no target is found, an indication is provided (92) on display panel 36 and the control goes into a quiescent state (93) awaiting further commands. If it is determined (94) that processor 64 has provided an indication that a target has been found, an indication is provided (96) on display panel 36 and the control returns to a normal mode (98), provided that the control is in a standard mode of operation. If no indications are being received from processor 64 (90, 94), then processor 62 monitors (82) photocell 30 in order to detect the modulated beam 24. A check is made at 84 as to whether the detected light is of the correct modulation frequency. If it is, processor 62 sends (86) a command over bus 70 to indicate that processor 62 detected the leading edge of a reflected beam 24. A second command is issued at 88 when processor 62 detects the trailing edge of reflected beam 24. If it is determined at 84 that the received light is not of the correct frequency, then program 76 again looks for indications from processor 64 (90, 94).

Program 76 responds at 78 to the user activating an alternate mode by monitoring (79) photocell 30 in order to detect signals from remote control 54. If a signal is detected, it is determined (81) whether a sleep command is received or a right/left sweep command is received. If a sleep command is received, the control returns to normal, standard mode (83). If a right/left sweep command is received, the line seek mode is invoked (80) and the control looks for indications from processor 64 (90, 94). If a "target found" indication is received (94, 96), the control returns to 79 to look for additional commands from the remote control. Otherwise, the control operates in the same manner as in the standard mode of operation.

Figure 9:
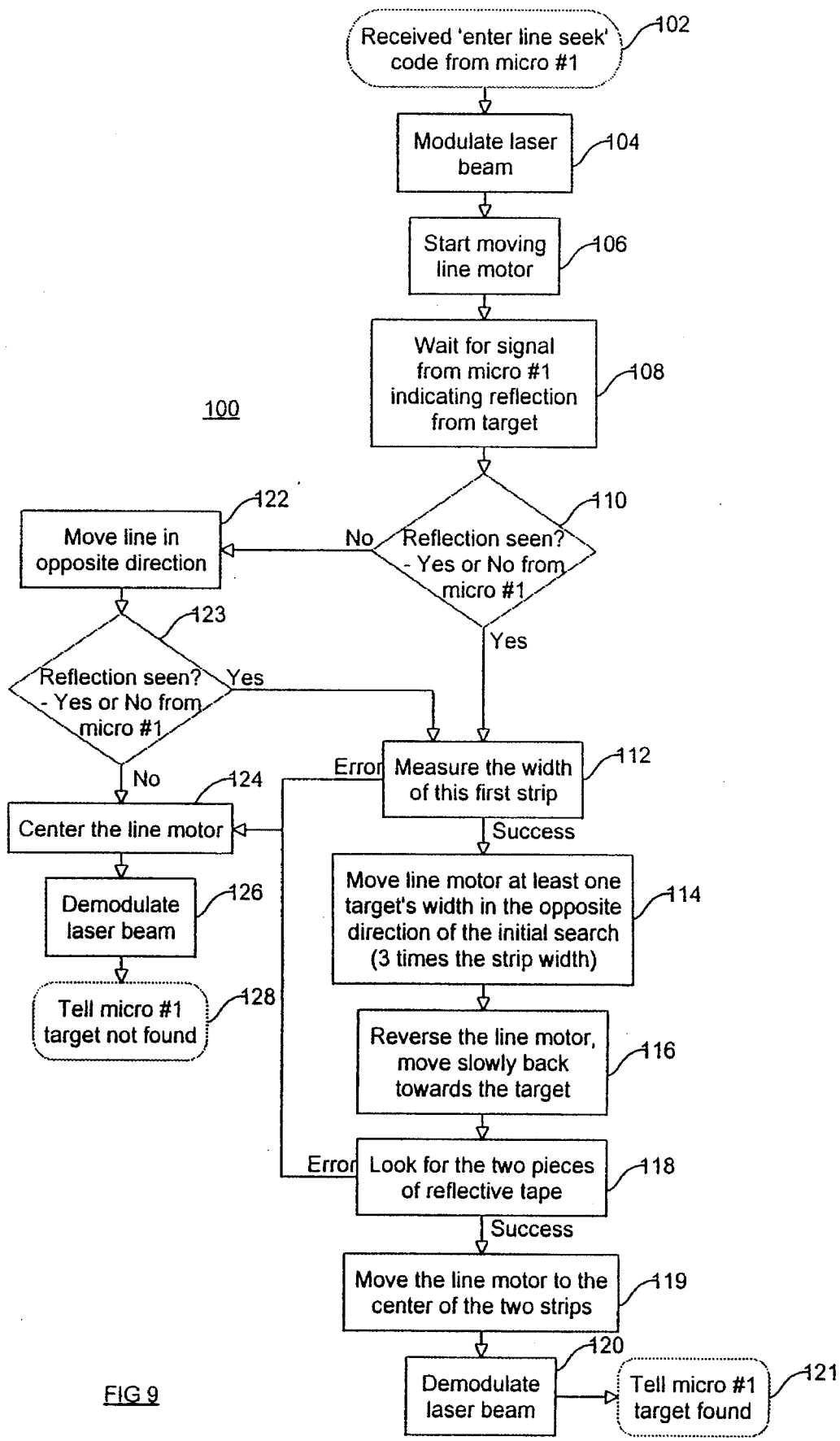
FIG. 9 is a flowchart of a control program for controlling beam, scanning and locating the beam at the center of the target.

A control program 100 for processor 64 is illustrated in FIG. 9. Control program 100 is initiated at 102 when a "enter line seek" signal is received from processor 62 indicating that the automatic alignment function is requested. Processor 64 then modulates (104) the beam generated by laser 28 and initiates movement (106) of the stepper motor 74. Processor 64 then waits (108) for a signal over bus 70 from processor 62 indicating receipt of a valid reflected beam 24. It is then determined (110) whether such reflected beam is detected before the line has moved fully to the end of travel in one direction. If the reflection is detected, then the width of the strip, in angular units is measured (112). The width of the strip is measured from the trailing edges of the reflection and includes the width of the beam. Once a trailing edge is detected, then the beam direction is momentarily reversed in order to find another trailing edge and thereby ensure that the entire strip width has been scanned. The line motor 74 is then moved in the direction opposite the direction of the initial search by a constant member related to the measured strip width that will ensure that both strips will be traversed in the subsequent scan. The constant member takes into account the known ratio of actual strip width to strip separation distance and, in the illustrated embodiment, is at least three times the strip width measured at 112. This should bring the beam to the opposite side of both reflective strips 52. The direction of the line motor is again reversed (116) and moved more slowly while looking for indications from processor 62 of received reflections. If two reflections are received (118), the measurement is successful and processor 64 moves (119) line motor 74 to the measured center of the strips, demodulates 120 the beam, and provides an indication (121) to processor 62 that the target has been successfully located.

If no reflection is detected (110), line motor 74 moves the line in the opposition direction. If a reflection is detected (123), an attempt is made to locate the two strips and center the line motor (112–121). If no reflection is detected (123) even though the line motor has reversed, it is concluded that the target is not present. The line motor is moved to some arbitrary position (124), the beam is demodulated (126) and an indication is provided (128) to processor 62 that no target is found. If routine 100 is not able to obtain a successful measurement of the width of a strip (112) or if only one of two reflective strips is located (118), then the self-aligning function is aborted (124–128). The self-aligning function (76, 100) addresses the difficulties associated with accurately locating the two strips 52 of retroreflective tape at both close-in distances and far-away distances. This is accomplished by first determining an angular width of a strip and then beginning a new scan after backing up the line a sufficient angular amount to SCAN over both of the strips.

A method of utilizing pipe-aligning apparatus 15 to lay a curved section of pipe is illustrated in FIG. 10, wherein a section of curved pipe 140, which is made up of a plurality of individual sections 142 is laid utilizing pipe-aligning apparatus 15'. In the illustrated embodiment, the laser unit of apparatus 15' is positioned on top of pipe section 140. The user positions the target at a first interface 144 between pipe sections 142 and aligns beam 22' on the target. A new section 142 is then put into place using conventional techniques, such as surveying procedures, to laterally position the distal end of the new section. The target is moved to interface 144 with the new section 142 and the reflected beam 22' is realigned with the target. This is preferably accomplished by using remote control 54 to scan the beam left or right. With the beam moved to the new location of the end of the pipeline and aligned with the target, the grade of the newly added section of pipe at the distal end of the pipeline can be established using beam 22'. The process is repeated for each subsequent section of pipe 142. The present invention comprehends the use of pipe-aligning apparatus 15' to also locate the lateral position of the distal end of each new section 142 by reading the angular position of the beam and matching such reading with corresponding data on the pipeline layout drawing.

Figure 12:
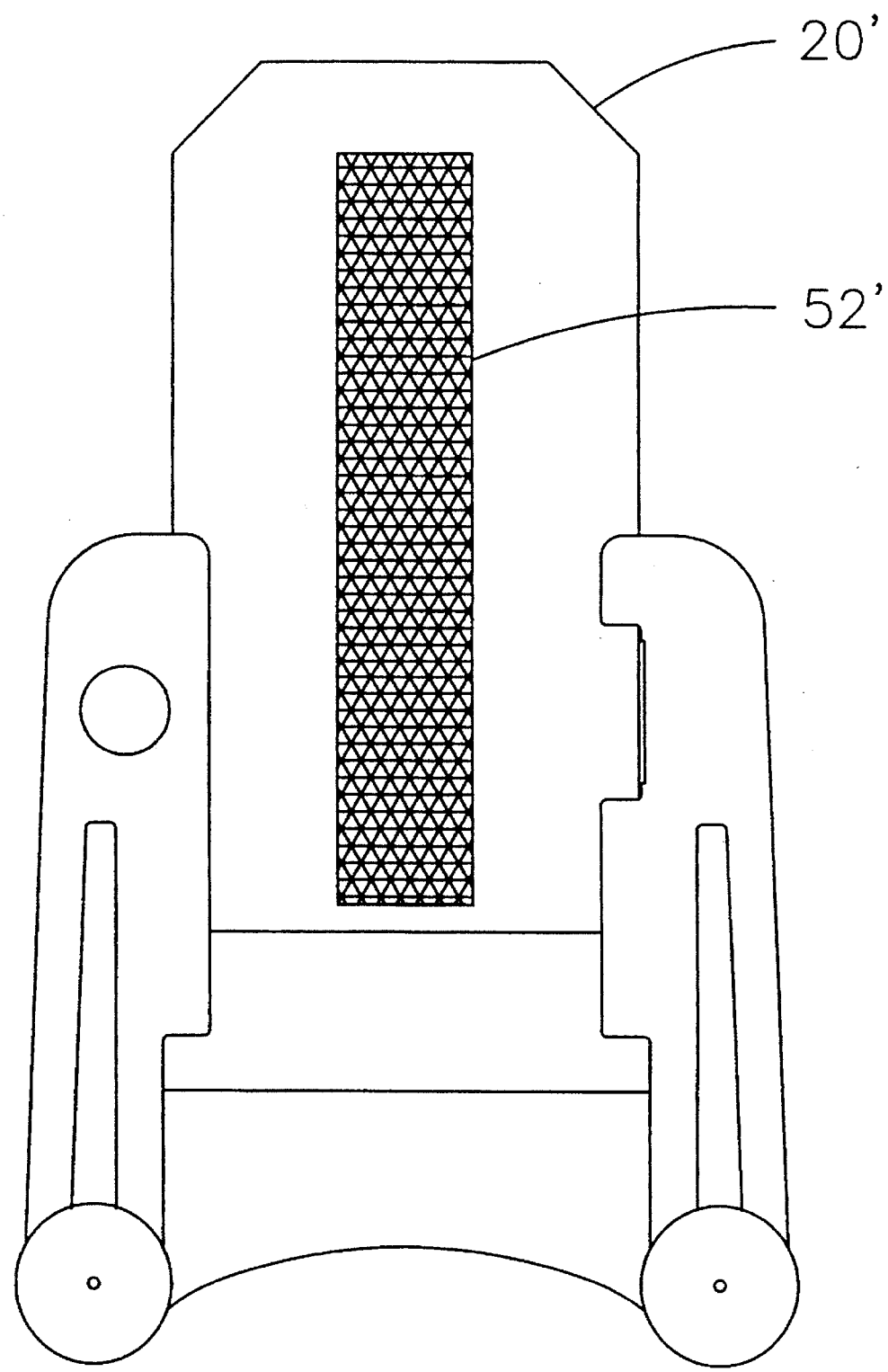
FIG. 12 is the same view as FIG. 5 of an alternative target.

If it is not necessary to have a translucent visual beam indicator on the target used with pipe-aligning apparatus 15, 15', then a target 20' may be utilized having only one centrally located retroreflection strip 52' (FIG. 12). If only one is used, then the beam is aligned with the center of the single strip rather than centrally between two strips. In the illustrated embodiment, laser unit 18 sweeps laser beam 22 along a path of 15 feet on each side of centerline at a 100-foot distance. This is equal to approximately 8.5 degrees from each side of centerline or approximately a 17-degree total sweep.

Thus, it is seen that the present invention provides a pipe-laying method and apparatus that is both easy to use and increases the capabilities of the operator in laying pipe. In particular, the operator is provided with the capability of single-handed operation of the apparatus from either the position of the laser unit or the position of the target. Furthermore, the invention is capable of use in laying curved sections of pipe as well as straight sections.

Although the invention has been described utilizing a pair of processors each running a separate program, the invention could also be carried out in a single processor or using dedicated digital or analog circuitry. Other changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A pipe-aligning apparatus for aligning individual sections of pipe in a pipeline comprising:

a target assembly having a body, a base configured to position said body in a pipe, a visual bull's-eye target defined on said body, and a pair of retroreflective strips at a given location with respect to said visual bull's-eye target; and a laser unit having a source for generating a collimated beam of light, a scanning device for scanning said collimated beam of light laterally within a particular angular range and for monitoring an angular position of said collimated beam of light, a receiver configured to receive light reflected from said retroreflective strips, and a control;

wherein said control is responsive to said angular position of said collimated beam of light when said receiver receives light reflected from said retroreflective strips in order to determine an angular position of said collimated beam of light which coincides with said visual bull's-eye target and to fixedly position said collimated beam of light substantially on said visual bull's-eye target.

2. The pipe-aligning apparatus in claim 1 wherein said receiver includes a light collector and a light sensor positioned to receive light collected by said light collector.

3. The pipe-aligning apparatus in claim 1 wherein said scanning device includes a stepper motor and linkage between said stepper motor and said source, wherein said stepper motor scans said source laterally by a particular increment in response to a command from said control.

4. The pipe aligning apparatus in claim 1 further including a remote control unit, said remote control unit including a user input selection device, a light generator and a remote control circuit which controls said light generator in response to user activation of said user input selection device, wherein light output from said remote control is received by said receiver in order to provide commands to said laser unit control.

5. The pipe-aligning apparatus in claim 1 wherein said control includes a first control program for determining that said receiver has received light and a second control program controlling said scanning device, wherein said second control program responds to said first control program indicating that the light beam reflected from the target has struck the receiver and wherein said first control program responds to said second control program indicating that the beam has been positioned on the target.

6. The pipe-aligning apparatus in claim 5 wherein said control includes a first processor for running said first control program and a second processor for running said second control program.

\* \* \* \* \*